United States Patent
Manwaring et al.

(10) Patent No.: US 7,743,681 B2
(45) Date of Patent: Jun. 29, 2010

(54) STEERING COLUMN ASSEMBLY HAVING AN ACTUATION MECHANISM FOR TELESCOPING AND TILTING MOVEMENT

(75) Inventors: Marvin V. Manwaring, Clio, MI (US); Ravi Ravindra, Saginaw, MI (US); Amelia M. Lask, Bay City, MI (US); Melvin L. Tinnin, Clio, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 409 days.

(21) Appl. No.: 11/732,641

(22) Filed: Apr. 4, 2007

(65) Prior Publication Data

US 2008/0245176 A1    Oct. 9, 2008

(51) Int. Cl.
*B62D 1/18* (2006.01)

(52) U.S. Cl. ................ 74/498; 74/492; 74/493; 280/775

(58) Field of Classification Search ........... 74/414, 74/422, 492–500, 484 R; 280/775
See application file for complete search history.

(56) References Cited

U.S. PATENT DOCUMENTS

| | | | | |
|---|---|---|---|---|
| 114,816 | A | * | 5/1871 | Hiestand ................... 254/97 |
| 3,765,259 | A | * | 10/1973 | Firth ...................... 74/354 |
| 4,460,154 | A | * | 7/1984 | Kunkle ................ 251/129.03 |
| 4,528,862 | A | | 7/1985 | Goldowsky |
| 4,530,254 | A | * | 7/1985 | Toyoda et al. ............. 74/493 |
| 4,594,909 | A | * | 6/1986 | Yamaguchi ............... 74/493 |
| 4,793,204 | A | * | 12/1988 | Kubasiak ................. 74/493 |
| 4,896,559 | A | | 1/1990 | Marier et al. |
| 4,900,059 | A | | 2/1990 | Kinoshita et al. |
| 4,941,679 | A | | 7/1990 | Baumann et al. |
| 5,010,779 | A | | 4/1991 | Herron et al. |
| 5,078,022 | A | * | 1/1992 | Ichikawa .................. 74/493 |
| 5,188,392 | A | * | 2/1993 | Sugiki et al. .............. 280/775 |
| 5,787,759 | A | * | 8/1998 | Olgren .................... 74/493 |
| 6,237,438 | B1 | * | 5/2001 | Ben Rhouma et al. ....... 74/492 |
| 6,419,269 | B1 | | 7/2002 | Manwaring et al. |
| 6,467,807 | B2 | | 10/2002 | Ikeda et al. |
| 7,083,198 | B2 | | 8/2006 | Lee |
| 7,093,855 | B2 | | 8/2006 | Manwaring et al. |
| 2002/0117841 | A1 | * | 8/2002 | Landmann ............... 280/775 |
| 2004/0035238 | A1 | | 2/2004 | Jolley et al. |
| 2004/0239089 | A1 | * | 12/2004 | Armstrong et al. ......... 280/775 |
| 2006/0266152 | A1 | | 11/2006 | Armstrong et al. |
| 2007/0170711 | A1 | * | 7/2007 | Bechtel et al. ............ 280/775 |

\* cited by examiner

*Primary Examiner*—Richard W Ridley
*Assistant Examiner*—Thomas Diaz
(74) *Attorney, Agent, or Firm*—Cantor Colburn LLP

(57) ABSTRACT

A steering column assembly for a vehicle includes a support bracket and a column jacket coupled to the support bracket. A compression bracket is mounted to the column jacket. A clamping device is disposed on the support bracket and has a rake bolt extending through the support bracket and the compression bracket for applying a frictional force on the support bracket to prevent telescoping and tilting movement of the column jacket and the compression bracket relative to the support bracket. An actuation mechanism is coupled to the support bracket. The actuation mechanism rotates the rake bolt in a first direction to prevent telescoping and tilting movement of the column jacket. Likewise, the actuation mechanism rotates the rake bolt in a second direction to permit telescoping movement of the column jacket and the compression bracket relative to the actuation mechanism and the support bracket and tilting movement.

3 Claims, 5 Drawing Sheets

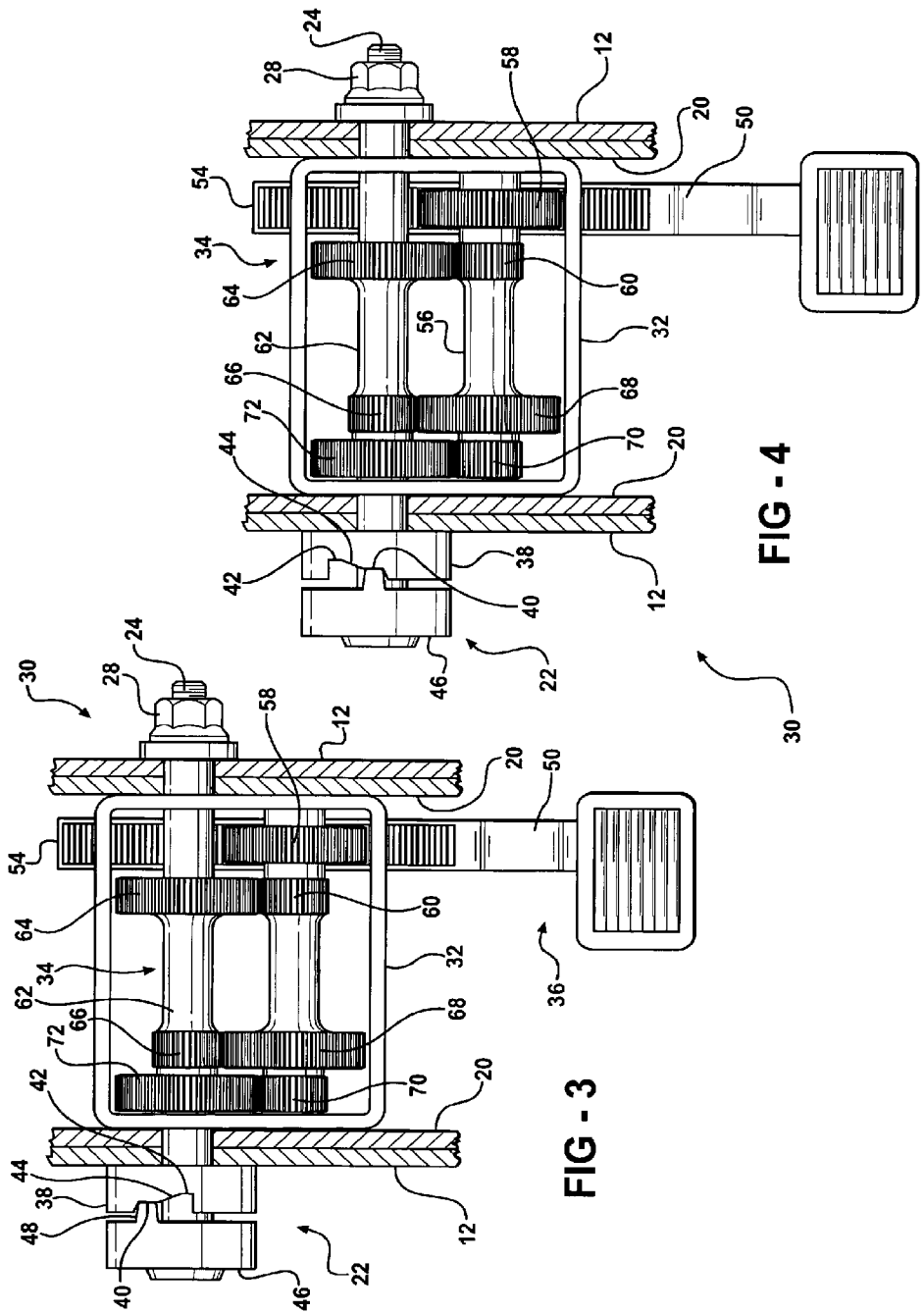

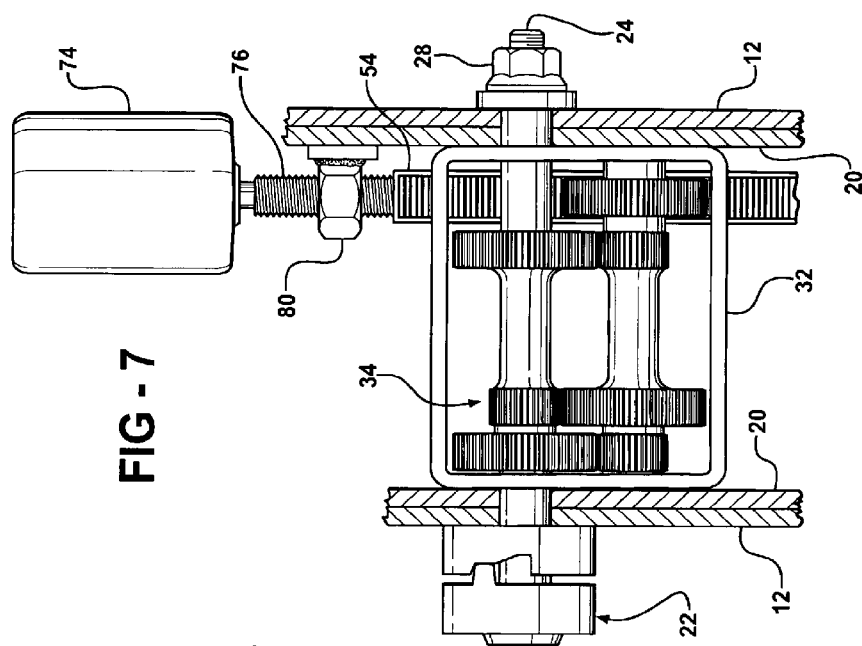
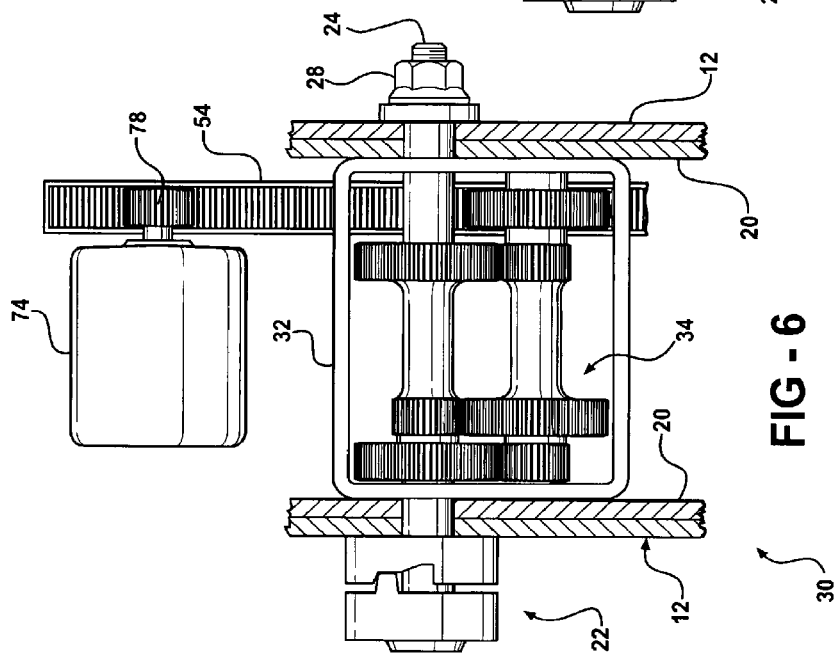

STEERING COLUMN ASSEMBLY HAVING AN ACTUATION MECHANISM FOR TELESCOPING AND TILTING MOVEMENT

BACKGROUND OF THE INVENTION

1. Field of the Invention

The present invention generally relates to a steering column assembly having an actuation mechanism for telescoping and tilting movement.

2. Description of the Related Art

Various steering column assemblies in vehicles are known in the art. Many vehicles are now equipped with steering column assemblies that allow for telescoping movement to adjust a distance between a driver of the vehicle and a steering wheel supported by the steering column assembly and tilting movement to adjust an angle of the steering column assembly relative to the driver. Despite these telescoping and tilting features, it is preferred that the steering column assembly remains stationary except when telescoping or tilting movement is desired by the driver. To prevent telescoping and tilting movement of the steering column assembly, various steering column assemblies use a compression bracket mounted to a column jacket.

An example of such a steering column assembly is shown in U.S. Pat. No. 7,093,855 (the '855 patent). The '855 patent discloses a steering column assembly for a vehicle that includes a support bracket for attachment to the vehicle. A column jacket is coupled to the support bracket and extends along a longitudinal axis. A compression bracket is mounted to the column jacket and defines a telescoping slot parallel to the longitudinal axis. A clamping device is disposed on the support bracket. The clamping device has a rake bolt extending transverse to the longitudinal axis, and the rake bolt extends through the support bracket and the telescoping slot of the compression bracket. With the rake bolt, the clamping device is able to apply a clamping force on the support bracket transverse to the longitudinal axis. When the clamping device applies the force, friction between the compression bracket and the support bracket prevents telescoping movement of the column jacket. To actuate the clamping device, the '855 patent discloses a lever connected to the clamping device.

The lever of the '855 patent is disposed off to the side of the column jacket. However, due to size constraints, it can be beneficial to provide a steering column assembly with the actuator centrally located with respect to the column assembly.

SUMMARY OF THE INVENTION AND ADVANTAGES

The subject invention provides a steering column assembly for a vehicle. The steering column assembly includes a support bracket for attachment to the vehicle. A column jacket is coupled to the support bracket and extends along a longitudinal axis. A compression bracket is mounted to the column jacket and defines a telescoping slot parallel to the longitudinal axis. A clamping device is disposed on the support bracket and has a rake bolt extending transverse to the longitudinal axis through the support bracket and the telescoping slot of the compression bracket. The rake bolt applies a clamping force on the support bracket transverse to the longitudinal axis to prevent at least one of telescoping and tilting movement of the column jacket and the compression bracket relative to the support bracket. An actuation mechanism is coupled to the support bracket. The actuation mechanism has a housing with a plurality of gears operatively engaged with the rake bolt. An actuator is operably connected to one of the plurality of gears for rotating the plurality of gears and the rake bolt in a first direction for applying the clamping force and preventing at least one of telescoping and tilting movement of the column jacket. In addition, the actuator rotates the plurality of gears and the rake bolt in a second direction to permit at least one of telescoping movement of the column jacket and the compression bracket along the longitudinal axis relative to the actuation mechanism and the support bracket and tilting movement.

The arrangement of the actuation mechanism of the subject invention allows the actuation mechanism to be centrally located with respect to the steering column assembly. This is particularly advantageous since this arrangement of the actuation mechanism provides great flexibility in steering column assemblies due to size restraints. In other words, centrally locating the actuation mechanism in the steering column assembly relative to the column jacket allows the actuation mechanism to take up less room in the passenger compartment of the vehicle.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3 is a partially cross-sectional top view of one embodiment of the actuation mechanism and clamping device;

FIG. 4 is a partially cross-sectional top view of another embodiment of the clamping device used with the actuation mechanism of FIG. 3;

FIG. 6 is a partially cross-sectional top view of another embodiment of the actuation mechanism; and FIG. 7 is a partially cross-sectional top view of yet another embodiment of the actuation mechanism.

DETAILED DESCRIPTION OF THE INVENTION

Figure 1:
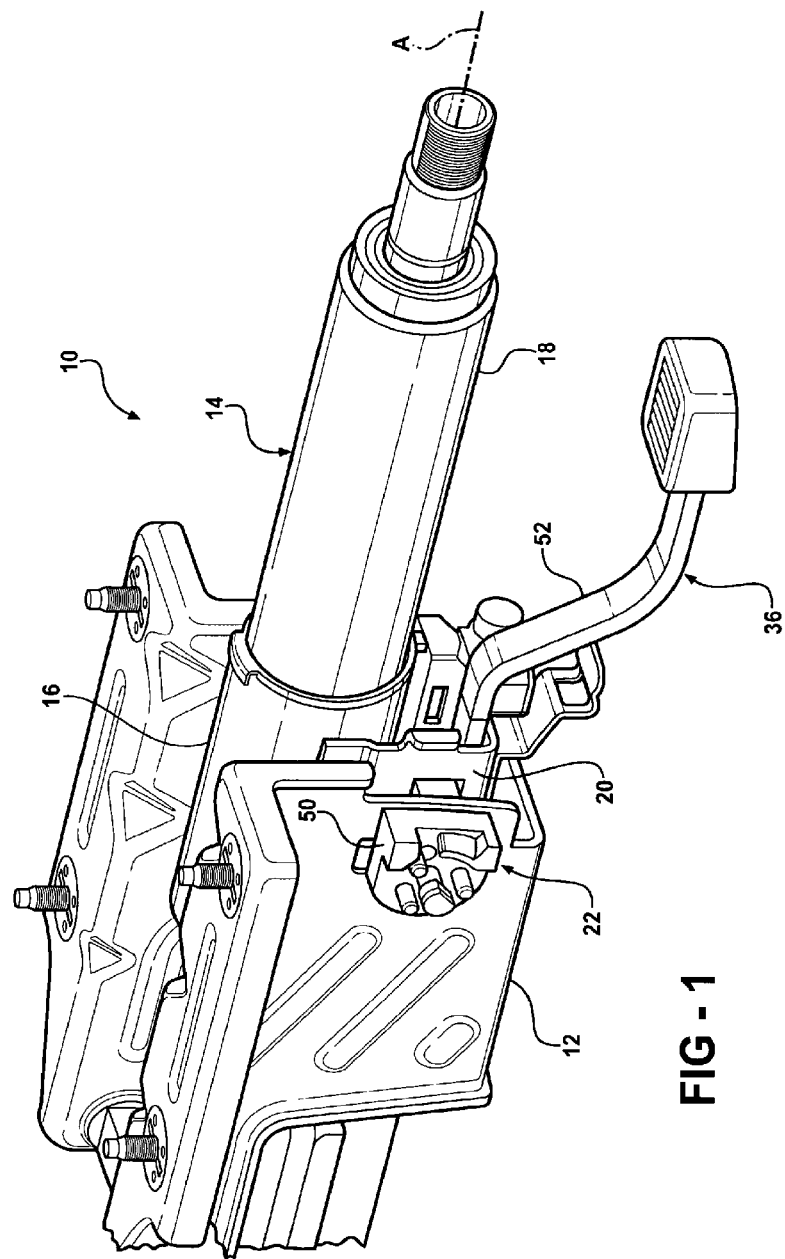
FIG. 1 is a perspective view of a steering column assembly having a support bracket, a column jacket, a compression bracket, a clamping device, and an actuation mechanism in accordance with the subject invention.

Referring to the Figures, wherein like numerals indicate corresponding parts throughout the several views, a steering column assembly for a vehicle is shown generally at 10 in FIG. 1. The steering column assembly 10 includes a support bracket 12 for attachment to the vehicle in any suitable manner. Preferably, a portion of the support bracket 12 has a U-shaped configuration. A column jacket 14 is coupled to the support bracket 12 and extends along a longitudinal axis A within the U-shaped portion of the support bracket 12. As discussed in greater detail below, the steering column assembly 10 permits telescoping movement of the column jacket 14 relative to the support bracket 12. Preferably, the column jacket 14 has a cylindrical configuration, and the column jacket 14 may be further defined as an outer jacket 16 and an inner jacket 18 coaxially aligned with the outer jacket 16. In the preferred embodiment, both the outer jacket 16 and the inner jacket 18 have the cylindrical configuration, although those skilled in the art realize that the column jacket 14 may have other configurations. The outer jacket 16 and the inner jacket 18 are fixed relative to one another during telescoping movement, but the inner jacket 18 may move relative to the outer jacket 16 during a crash condition. In addition to telescoping movement, the steering column assembly 10 may further allow for tilting movement. In the case of tilting movement, the support bracket 12 may be a rake bracket provide with raking slots 19 as shown.

Figure 2:
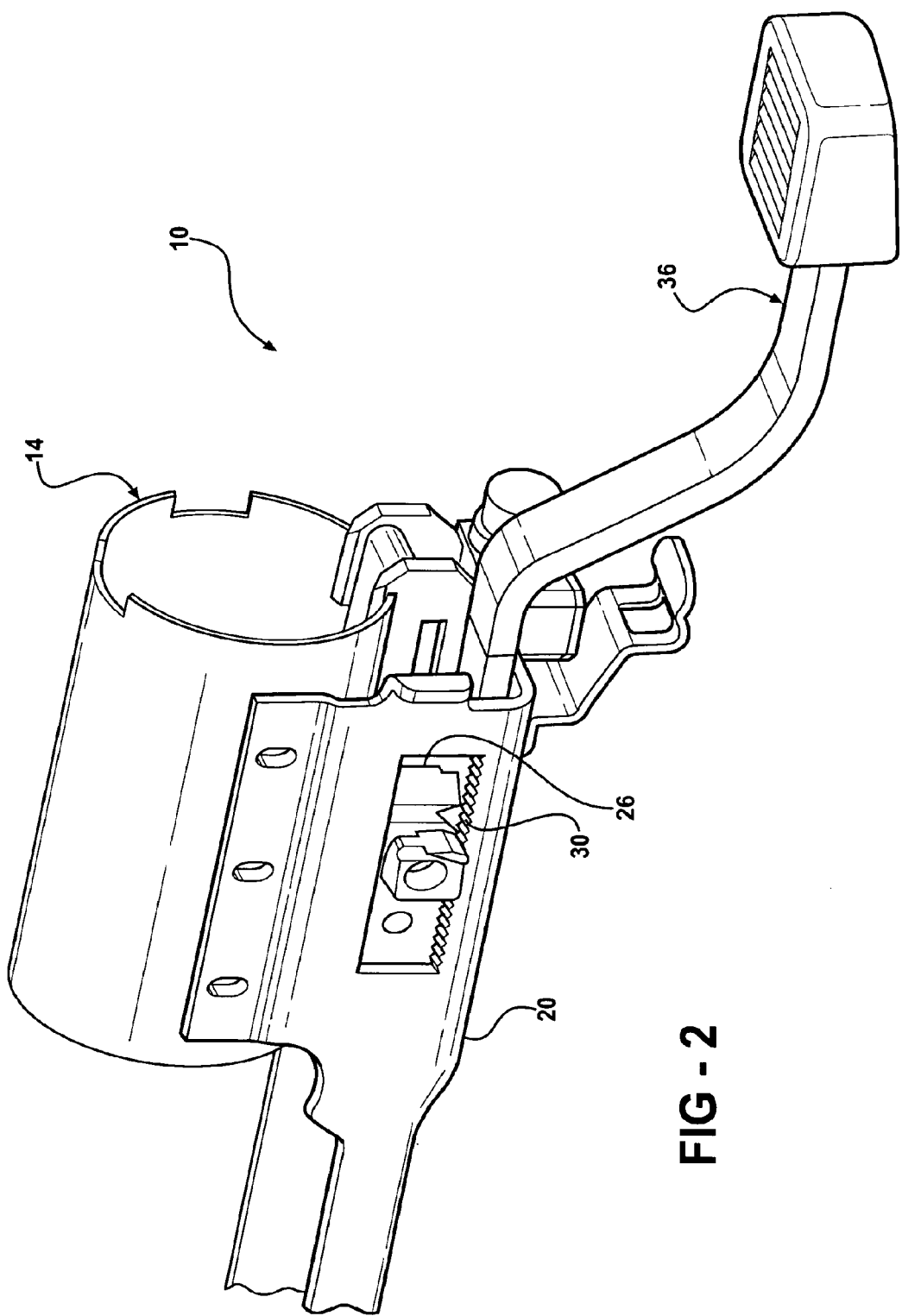
FIG. 2 is a perspective view of the steering column assembly of FIG. 1 with the support bracket and a portion of the clamping device removed.

Referring also to FIG. 2, a compression bracket 20 is mounted to the column jacket 14 and defines a telescoping slot 26 parallel to the longitudinal axis A. Preferably, the compression bracket 20 is resistance welded to the column jacket 14, and more specifically, to the outer jacket 16. The compression bracket 20 is disposed between the support bracket 12 and the column jacket 14. Like the support bracket 12, a portion of the compression bracket 20 has a U-shaped configuration.

A clamping device 22 is disposed on the support bracket 12 and has a rake bolt 24 extending transverse to the longitudinal axis A through the raking slots 19 of the support bracket 12. The rake bolt 24 also extends through the telescoping slot 26 of the compression bracket 20. The telescoping slot 26 is best shown in FIG. 2. As shown in FIG. 3, a lock nut 28 is disposed about the rake bolt 24 opposite the clamping device 22 for holding the rake bolt 24 in place as it extends through the compression bracket 20 and the support bracket 12. By extending the rake bolt 24 through the telescoping slot 26 of the compression bracket 20 and through the raking slots 19 of the support bracket 12, the rake bolt 24 can apply a clamping force on the support bracket 12 transverse to the longitudinal axis A to prevent telescoping and tilting movement of the column jacket 14 and the compression bracket 20 relative to the support bracket 12.

As shown in greater detail in FIGS. 3 and 4, an actuation mechanism 30 is coupled to the support bracket 12 and the compression bracket 20. In other words, the actuation mechanism 30 remains fixed relative to the support bracket 12 as the column jacket 14 moves relative to the support bracket 12 during telescoping movement, and remains fixed relative to the compression bracket 20 as the column jacket 14 moves relative to the support bracket 12 during tilting movement. Preferably, the actuation mechanism 30 is disposed below the column jacket 14 and both the compression bracket 20 and the support bracket 12 are disposed about the actuation mechanism 30. The actuation mechanism 30 has a housing 32 with a plurality of gears 34 operatively engaged with the rake bolt 24. As used herein, the plurality of gears 34 refers to both gears and pinion gears that are disposed within the housing 32. As it relates to the present invention, the gear is a toothed wheel and the pinion gear is a toothed wheel that is smaller in size than the gear. Although only two gear sizes are shown in the Figures, it is to be understood that the gears and pinion gears in the housing 32 may have other sizes and that the ratio of the teeth of the gears and pinion gears may be any ratio.

The actuation mechanism 30 further includes an actuator 36 operably connected to one of the plurality of gears 34. The actuator 36 rotates the plurality of gears 34 and the rake bolt 24 in a first direction. Depending on the orientation of the clamping device 22, as discussed in greater detail below, the actuator 36 may rotate the plurality of gears 34 and the rake bolt 24 in the first direction by either pushing or pulling the actuator 36. When rotated in the first direction, the frictional force is applied and prevents at least one of telescoping and tilting movement of the column jacket 14 relative to the support bracket 12. Likewise, rotating the plurality of gears 34 and the rake bolt 24 in a second direction permits at least one of telescoping and tilting movement of the column jacket 14 and the compression bracket 20 relative to the support bracket 12. Again, depending on the orientation of the clamping device 22, the actuator 36 may rotate the plurality of gears 34 and the rake bolt 24 in the second direction and permit at least one of telescoping and tilting movement of the column jacket 14 by either pushing or pulling the actuator 36.

The clamping device 22 shown in FIGS. 3 and 4 includes a follower 38 disposed about the rake bolt 24 and abutting the support bracket 12. The rake bolt 24 rotates independently of the follower 38. In other words, as the rake bolt 24 rotates, the follower 38 remains stationary relative to the rake bolt 24. The follower 38 has a raised portion 40, a recessed portion 42 spaced from the raised portion 40, and a ramped portion 44 interconnecting the raised portion 40 and the recessed portion 42. The clamping device 22 further includes a cam 46 fixed to the rake bolt 24 that rotates with the rake bolt 24. The cam 46 has a protrusion 48 that abuts one of the raised portion 40, the recessed portion 42, and the ramped portion 44. The protrusion 48 abuts the raised portion 40 for pushing the follower 38 against the support bracket 12 to apply the clamping force transverse to the longitudinal axis A. As the rake bolt 24 rotates the cam 46, the protrusion 48 pushes the raised portion 40 of the follower 38, and the follower 38 moves in a direction transverse to the longitudinal axis A toward the support bracket 12. This causes the support bracket 12 to press against the compression bracket 20 and apply the frictional force to prevent at least one of telescoping and tilting movement of the column jacket 14. The protrusion 48 abuts the recessed portion 42 for releasing the follower 38 from applying the clamping force. As the protrusion 48 moves into the recessed portion 42 of the follower 38, the follower 38 no longer applies the clamping force transverse to the longitudinal axis A, which permits at least one of telescoping and tilting movement of the column jacket 14. The protrusion 48 abuts the ramped portion 44 for moving the protrusion 48 between the raised portion 40 and the recessed portion 42 as the rake bolt 24 rotates the cam 46.

Continuing with FIGS. 3 and 4, the locations of the raised portion 40, the recessed portion 42, and the ramped portion 44 of the follower 38 relative to one another determine whether the clamping device 22 is enabled by pushing or pulling the actuator 36. For instance, as shown in FIG. 3, the follower 38 is designed to enable the clamping device 22 when the actuator 36 is pushed toward the housing 32. Accordingly, the follower 38 is designed to disable the clamping device 22 when the actuator 36 is pulled away from the housing 32. Alternatively, as shown in FIG. 4, the follower 38 is designed to enable the clamping device 22 when the actuator 36 is pulled away from the housing 32. Accordingly, the follower 38 is designed to disable the clamping device 22 when the actuator 36 is pushed toward the housing 32. It is to be understood that these arrangements of the follower 38 are interchangeable with any embodiment of the clamping device 22, regardless of whether the actuator 36 initiates a pushing or pulling motion for enabling the clamping device 22 so long as the protrusion 48 of the cam 46 abuts the raised portion 40 of the follower 38 when the clamping device 22 is enabled to prevent at least one of telescoping and tilting movement and the protrusion 48 of the cam 46 abuts the recessed portion 42 of the follower 38 when the clamping device 22 is disabled to permit at least one of telescoping and tilting movement. Alternatively, as shown in FIG. 1, instead of the cam 46 and follower 38, the clamping device 22 may include a pin clamp 50 disposed about the rake bolt 24 and abutting the support bracket 12 for applying the clamping force to the support bracket 12. It is to be understood that the pin clamp 50 may replace the cam 46 and follower 38 in any embodiment of the clamping device 22, and further alternatives of this portion of the clamping device 22 are possible.

Regardless of how the clamping device 22 is oriented, the column jacket 14 moves along the longitudinal axis A independent of the actuation mechanism 30, the support bracket 12, and the clamping device 22. Therefore, during telescoping movement, the actuation mechanism 30, the support bracket 12, and the clamping device 22 remain stationary, while the column jacket 14 and the compression bracket 20 move. Referring now to FIG. 2, because the rake bolt 24 extends through the compression bracket 20 and the housing 32 of the actuation mechanism 30, the compression bracket 20 defines the telescoping slot 26 discussed above on each side of the compression bracket 20. The telescoping slot 26 is an elongated slot that extends in a direction parallel to the longitudinal axis A. As previously discussed, the rake bolt 24 extends through the telescoping slot 26 so that the compression bracket 20 and the column jacket 14 can slide relative to the actuation mechanism 30.

Referring to FIGS. 3 and 4, the plurality of gears 34 is further defined as a first set of gears disposed on the rake bolt 24 and a second set of gears coupled to the first set of gears. As with the plurality of gears 34, the first set of gears and the second set of gears may include the gears or the pinion gears disposed within the housing 32. The actuator 36 is shown as a lever 52 having a rack 54 with teeth engaging one of the plurality of gears 34. However, those skilled in the art realize that the actuator 36 may be any other type of actuator 36 known in the art. This arrangement of the plurality of gears 34 and the actuator 36 allows for gear reduction. In other words, the actuator 36 may move a longer distance than the distance the clamping device 22 moves to cause the clamping device 22 to apply the clamping force to the support bracket 12. The actuation mechanism 30 further includes a first shaft 56 parallel to and spaced from the rake bolt 24. The second set of gears is disposed on the first shaft 56 and coupled to the actuator 36 for rotating the first set of gears and the rake bolt 24 in response to the actuator 36 rotating the second set of gears. The lock nut 28 is disposed about the rake bolt 24 opposite the clamping device 22 for holding the rake bolt 24 in the housing 32.

In the embodiment of FIGS. 3 and 4, the actuation mechanism 30 includes the first shaft 56 parallel to and spaced from the rake bolt 24. The plurality of gears 34 is further defined as having a first gear 58 disposed on the first shaft 56 and coupled to the actuator 36. A first pinion gear 60 is disposed on the first shaft 56 and fixed to the first gear 58 for rotating with the first gear 58 and the first shaft 56. In other words, as the actuator 36 rotates the first gear 58, the first pinion gear 60 rotates with the first gear 58 about the first shaft 56. Moreover, a second shaft 62 is disposed about and coaxially aligned with the rake bolt 24. The second shaft 62 fits over the rake bolt 24 and rotates independently of the rake bolt 24. The plurality of gears 34 includes a second gear 64 disposed on the second shaft 62. The second gear 64 is coupled to the first pinion gear 60. A second pinion gear 66 is disposed on the second shaft 62 and spaced from the second gear 64 for rotating with the second gear 64 and the second shaft 62. Furthermore, a third gear 68 is disposed on the first shaft 56 and is coupled to the second pinion gear 66. A third pinion gear 70 is disposed on the first shaft 56 and is fixed to the third gear 68. Finally, a fourth gear 72 is disposed on the rake bolt 24 and is coupled to the third pinion gear 70 for rotating the rake bolt 24. As the rake bolt 24 rotates, the clamping device 22 either enables or disables telescoping and tilting movement of the column jacket 14. Therefore, moving the actuator 36 rotates each of the plurality of gears 34 to rotate the rake bolt 24 and either permits or prevents telescoping and tilting movement of the column jacket 14.

Figure 5:
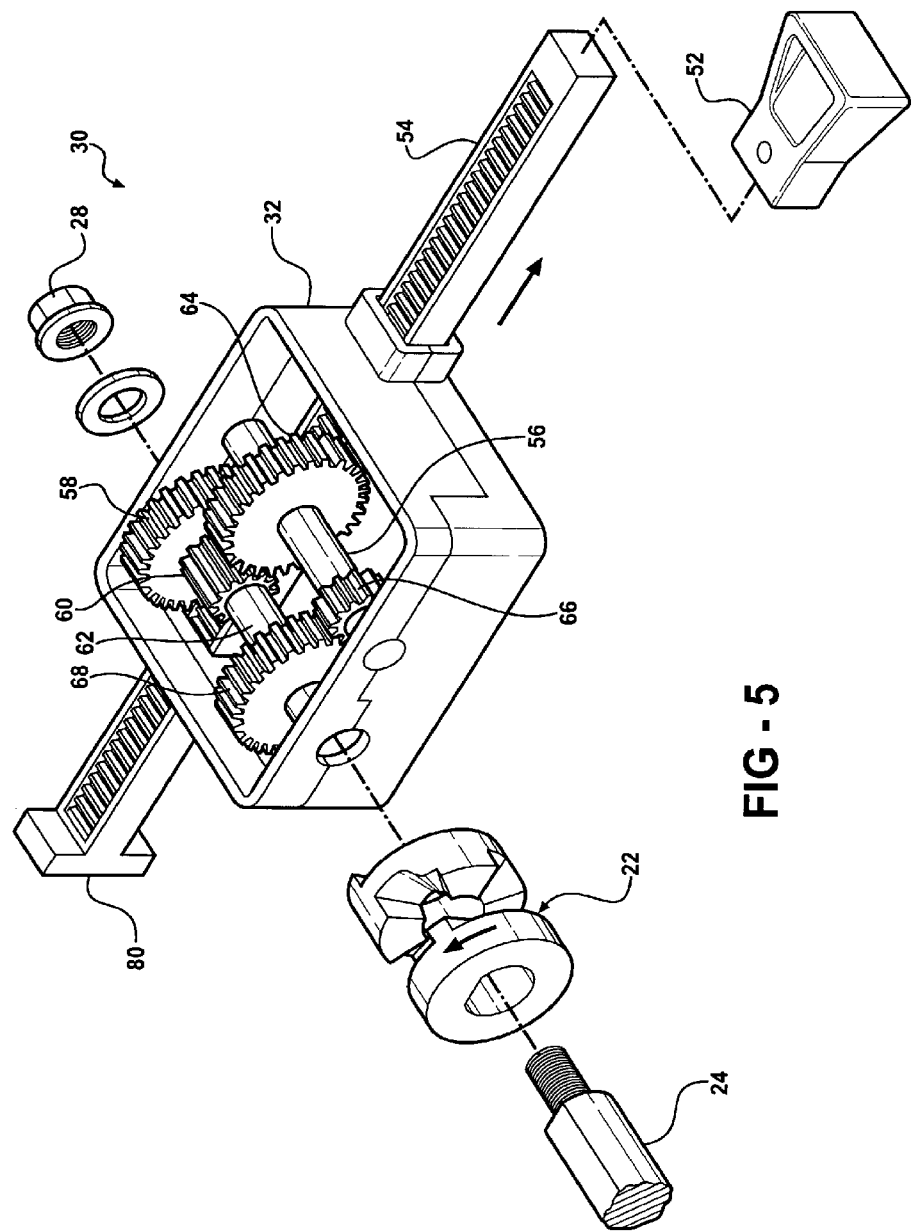
FIG. 5 is a partially exploded view of another embodiment of the actuation mechanism.

Referring specifically to FIG. 5, in another embodiment, the actuation mechanism 30 includes the first shaft 56 parallel to and spaced from the rake bolt 24 and the second shaft 62 is disposed about and is coaxially aligned with the rake bolt 24. As in the previous embodiment, the second shaft 62 rotates about the rake bolt 24 independent of the rake bolt 24. However, in this embodiment, the first gear 58 is disposed on the second shaft 62 and is coupled to the actuator 36. The actuator 36 rotates the first gear 58 about the second shaft 62 independent of the rake bolt 24. The first pinion gear 60 is disposed on the second shaft 62 and is fixed to the first gear 58. Therefore, the first pinion gear 60 rotates with the first gear 58 and the second shaft 62. The second gear 64 is disposed on the first shaft 56 and is coupled to the first pinion gear 60. The second pinion gear 66 is disposed on the first shaft 56 and is spaced from the second gear 64 for rotating with the second gear 64 and the first shaft 56. The third gear 68 is disposed on the rake bolt 24 and is coupled to the second pinion gear 66 for rotating the rake bolt 24. As the rake bolt 24 rotates, the clamping device 22 either enables or disables telescoping and tilting movement of the column jacket 14. Therefore, moving the actuator 36 rotates each of the plurality of gears 34 to rotate the rake bolt 24 and either permits or prevents telescoping and tilting movement of the column jacket 14.

Various types of actuators 36 may be used with either of the embodiments described above. For instance, as shown in FIGS. 1-5, the actuator 36 is shown as the lever 52 having teeth mating with one of the plurality of gears 34 as previously described. Alternatively, as shown in FIGS. 6 and 7, the actuator 36 may include a motor 74 coupled to one of the plurality of gears 34. As shown in FIG. 6, the actuator 36 may include the rack 54 having teeth coupled to one of the plurality of gears 34 and the motor 74 having a drive pinion gear 78 coupled to the rack 54 for moving the rack 54 parallel with the longitudinal axis A to rotate the plurality of gears 34 and the rake bolt 24. Furthermore, at least a portion of the actuator 36 may extend in a direction perpendicular to the longitudinal axis A. For instance, as shown in FIG. 6, the motor 74 extends in the direction perpendicular to the longitudinal axis A. To prevent the motor 74 from moving, the motor 74 may be mounted to the housing 32.

Referring to FIG. 7, the actuator 36 may be defined as the motor 74 having the spirally threaded spindle 76 coupled to one of the plurality of gears 34. For instance, the actuator 36 may include the rack 54 having teeth coupled to one of the plurality of gears 34 and the motor 74 having the spirally threaded spindle 76 coupled to the rack 54 for moving the rack 54 parallel with the longitudinal axis A to rotate the plurality of gears 34. Preferably, one side of the rack 54 is coupled to one of the plurality of gears 34, and another side of the rack 54 is coupled to the spirally threaded spindle 76. A nut 80 threaded onto the spindle 76 is attached to the rack 54. Translation of the nut 80 along the rotating spindle 76 causes rack 54 to move longitudinally, thereby imparting rotation to the plurality of gears 34. The teeth of the rack 54 are always in contact with at least one of the gears. Furthermore, at least a portion of the actuator 36 may extend in a direction parallel to the longitudinal axis A. For instance, as shown in FIG. 7, the motor 74 extends in the direction parallel to the longitudinal axis A. As in the previous embodiment, the motor 74 may be mounted to the housing 32.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims the invention may be practiced otherwise than as specifically described.

What is claimed is:

1. A steering column assembly for a vehicle, said steering column assembly comprising:
- a support bracket for attachment to the vehicle;
- a column jacket coupled to said support bracket and extending along a longitudinal axis;
- a compression bracket mounted to said column jacket and defining a telescoping slot parallel to said longitudinal axis;
- a clamping device disposed on said support bracket and having a rake bolt extending transverse to said longitudinal axis through said support bracket and said telescoping slot of said compression bracket for applying a clamping force on said support bracket transverse to said longitudinal axis to prevent at least one of telescoping and tilting movement of said column jacket and said compression bracket relative to said support bracket;
- an actuation mechanism coupled to said support bracket and having a housing with a plurality of gears operatively engaged with said rake bolt and an actuator operably connected to one of said plurality of gears for rotating said plurality of gears and said rake bolt in a first direction for applying the clamping force and preventing at least one of telescoping and tilting movement of said column jacket relative to said support bracket and rotating said plurality of gears and said rake bolt in a second direction for permitting at least one of telescoping movement of said column jacket and said compression bracket along said longitudinal axis relative to said actuation mechanism and said support bracket and tilting movement of said column jacket;
- wherein said actuation mechanism further includes a first shaft parallel to and spaced from said rake bolt and wherein said plurality of gears is further defined as having a first gear disposed on said first shaft and coupled to said actuator and a first pinion gear disposed on said first shaft and fixed to said first gear for rotating with said first gear and said first shaft; and
- further including a second shaft disposed about and coaxially aligned with said rake bolt and wherein said plurality of gears is further defined as having a second gear disposed on said second shaft and engaging said first pinion gear and a second pinion gear disposed on said second shaft and spaced from said second gear for rotating with said second gear and said second shaft.

2. A steering column assembly as set forth in claim 1 wherein said plurality of gears is further defined as having a third gear disposed on said first shaft and coupled to said second pinion gear and a third pinion gear disposed on said first shaft and fixed to said third gear.

3. A steering column assembly as set forth in claim 2 wherein said plurality of gears is further defined as having a fourth gear disposed on said rake bolt and coupled to said third pinion gear for rotating said rake bolt.

* * * * *